United States Patent [19]
Sprotbery et al.

[11] Patent Number: 5,907,437
[45] Date of Patent: May 25, 1999

[54] CONVERGING OPTICS FOR A SINGLE LIGHT VALVE FULL-COLOR PROJECTOR

[75] Inventors: Donald E. Sprotbery, Cape Coral, Fla.; Arno G. Ledebuhr, Tracy, Calif.

[73] Assignee: Hughes-JVC Technology Corporation, Carlsbad, Calif.

[21] Appl. No.: 08/891,393

[22] Filed: Jul. 10, 1997

[51] Int. Cl.$^6$ .............................. G02B 27/10; G02B 3/00
[52] U.S. Cl. ............................................ 359/618; 359/649
[58] Field of Search .................................. 359/618, 638, 359/649–655

[56] References Cited

U.S. PATENT DOCUMENTS

| | | | |
|---|---|---|---|
| 4,995,702 | 2/1991 | Aruga | 350/331 |
| 4,999,703 | 3/1991 | Henderson | 358/60 |
| 5,168,351 | 12/1992 | Badley | 358/60 |
| 5,345,262 | 9/1994 | Yee et al. | 348/177 |
| 5,499,139 | 3/1996 | Chen | 350/432 |
| 5,786,934 | 7/1998 | Chiu | 359/494 |
| 5,795,047 | 8/1998 | Sannohe | 359/650 |

*Primary Examiner*—Geogia Epps
*Assistant Examiner*—Michael A Lucas
*Attorney, Agent, or Firm*—Harness, Dickey & Pierce, P.L.C.

[57] ABSTRACT

A light valve image projection system (10) wherein the optical registration of individual primary color images on a projection screen (14) is substantially immune to modification of the projection throw distance is disclosed herein. The inventive light valve projection system (10) is operative to project a composite optical image onto the screen (14), and includes an optical light valve apparatus (18, 19, 20) for generating first and second optical images. A converging optical system (22), in optical alignment with one or more light valves (20), is disposed to overlap the first and second images into a composite image along an optical axis. The projection system (10) of the present invention further includes a projection lens (24) for illuminating the screen (14) with the composite image.

24 Claims, 3 Drawing Sheets

CONVERGING OPTICS FOR A SINGLE LIGHT VALVE FULL-COLOR PROJECTOR

BACKGROUND OF THE INVENTION

1. Technical Field

The present invention relates to light valve image projection systems, and more specifically, to multi-color light valve image projection systems.

2. Discussion

In conventional color projection systems employing optical light valves, three primary color images (red, green and blue) are displayed in optical registration on a viewing screen. The three primary color images are typically generated by three separate light valves and projected on the screen by three separate projection lenses. The projection lenses are arranged about an optical axis which typically passes through the composite image displayed on the screen. In such an arrangement, it is necessary that the three primary color images converge in the plane occupied by the screen. In other words, the convergence of the three primary color images is dependent upon the distance between the screen and the projection lenses. This method of projection suffers from the disadvantage that the projection lens arrangement must be reconfigured when the distance between the projection lenses and the screen is altered.

In certain applications the space which may be occupied by the projection system is limited. This often requires that the screen be positioned in relatively close proximity to the projection lens. Such a short "projection throw distance" generally necessitates usage of wide-angle projection lenses. However, the relatively large size of wide-angle lenses complicates the deployment thereof.

In other conventional color projection systems, a single projection lens having three sections is utilized in lieu of the set of three projection lenses. Again, however, the displacement of each lens section from a common optical axis precludes registration of the primary color images until convergence on the screen. As a consequence, systems incorporating sectioned projection lenses must also be altered in response to changes in the separation between the projection lens and screen.

Hence, a need exists for a compact, full-color optical light valve projection system in which convergence of the primary color images is relatively independent of the projection throw distance.

SUMMARY OF THE INVENTION

The need in the art for a full-color optical light valve projection system wherein the optical registration of individual primary color images on a projection screen is relatively immune to modification of the projection throw distance is addressed by the light valve image projection system of the present invention. The inventive light valve projection system projects a composite optical image onto a screen and includes an optical light valve apparatus for generating first and second optical images. An arrangement of converging optics, in optical alignment with the light valve apparatus, is disposed to overlap the first and second images into a composite image along an optical axis. The projection system of the present invention further includes a projection lens for illuminating the screen with the composite image.

Other objects, features and advantages will be readily apparent from the foregoing specification, drawings and claims.

BRIEF DESCRIPTION OF THE DRAWINGS

The various advantages of the present invention will become apparent to those skilled in the art after studying the following specification and by reference to the drawings in which.

DETAILED DESCRIPTION OF THE INVENTION

While the invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
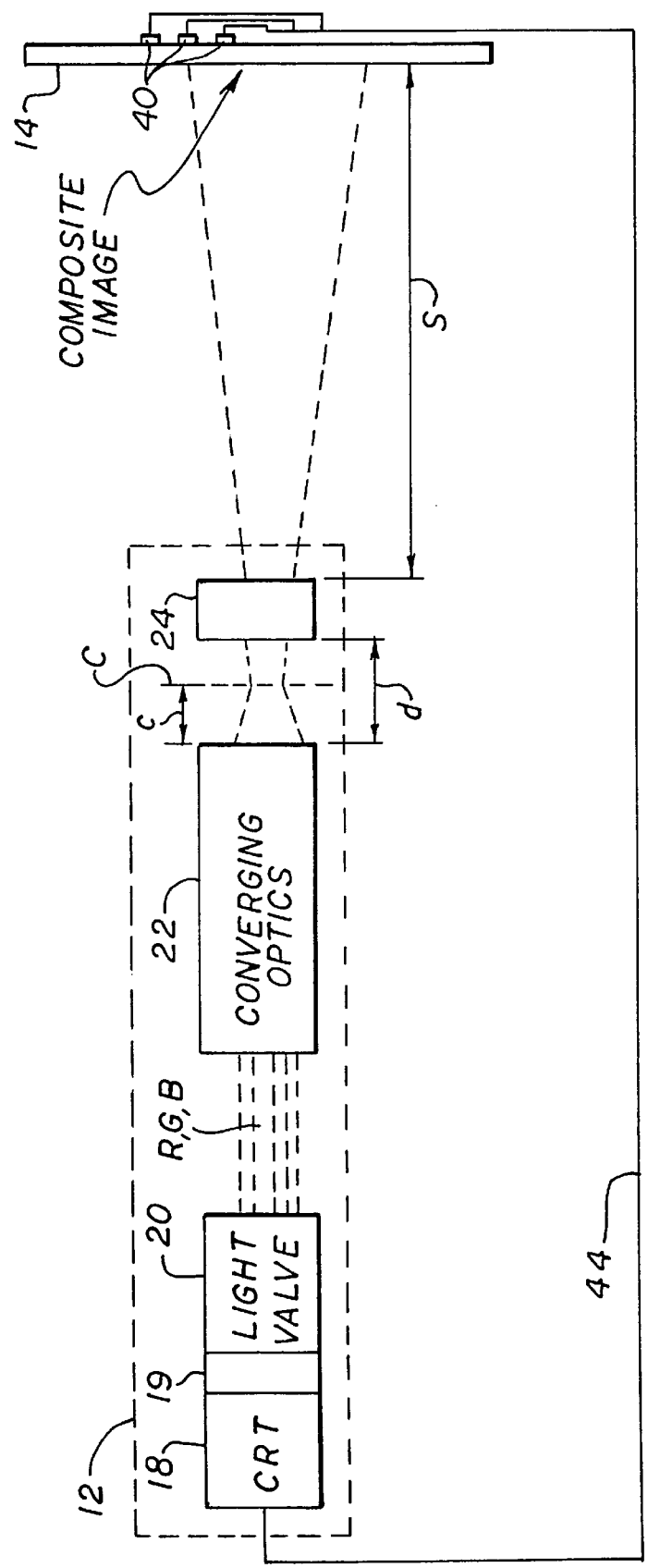
FIG. 1 shows a light valve image projection system according to the present invention.

FIG. 1 shows a preferred embodiment of the light valve projection system 10 of the present invention which includes an image projector 12 for projecting a full-color image upon a screen 14. As will be described more fully below, cathode ray tubes (CRT) 18 and associated fiber optic face plates 19 positioned within the projector 12 drive light valves 20 to generate red (R), green (G) and blue (B) primary color images. Skilled artisans can appreciate that a single light valve having three separate portions or three separate light valves can be employed. A converging optical system 22, in optical alignment with the light valve 20, overlaps the red, green and blue primary color images such that the primary color images substantially converge at a convergence plane designated "C" in FIG. 1.

The convergence plane "C" is located a convergence distance "c" from converging optics 22. The converged primary color images are projected by a projection lens 24 to form a composite, full-color image on the screen 14. Using the converging optical system 22 according to the present invention, the optical registration of the primary color images within the projected composite image is made substantially independent of the separation "S" between screen 14 and projection lens 24. Projection lens 24 and converging optical system 22 are preferably separated by a separation distance "d" that exceeds the convergence distance "c". As will be described below, the inventive projection system 10 overcomes a principal disadvantage of conventional light valve projectors in that a change in the separation "S" between screen 14 and projection lens 24 does not require a corresponding modification of projector 12.

Figures 2, 3:
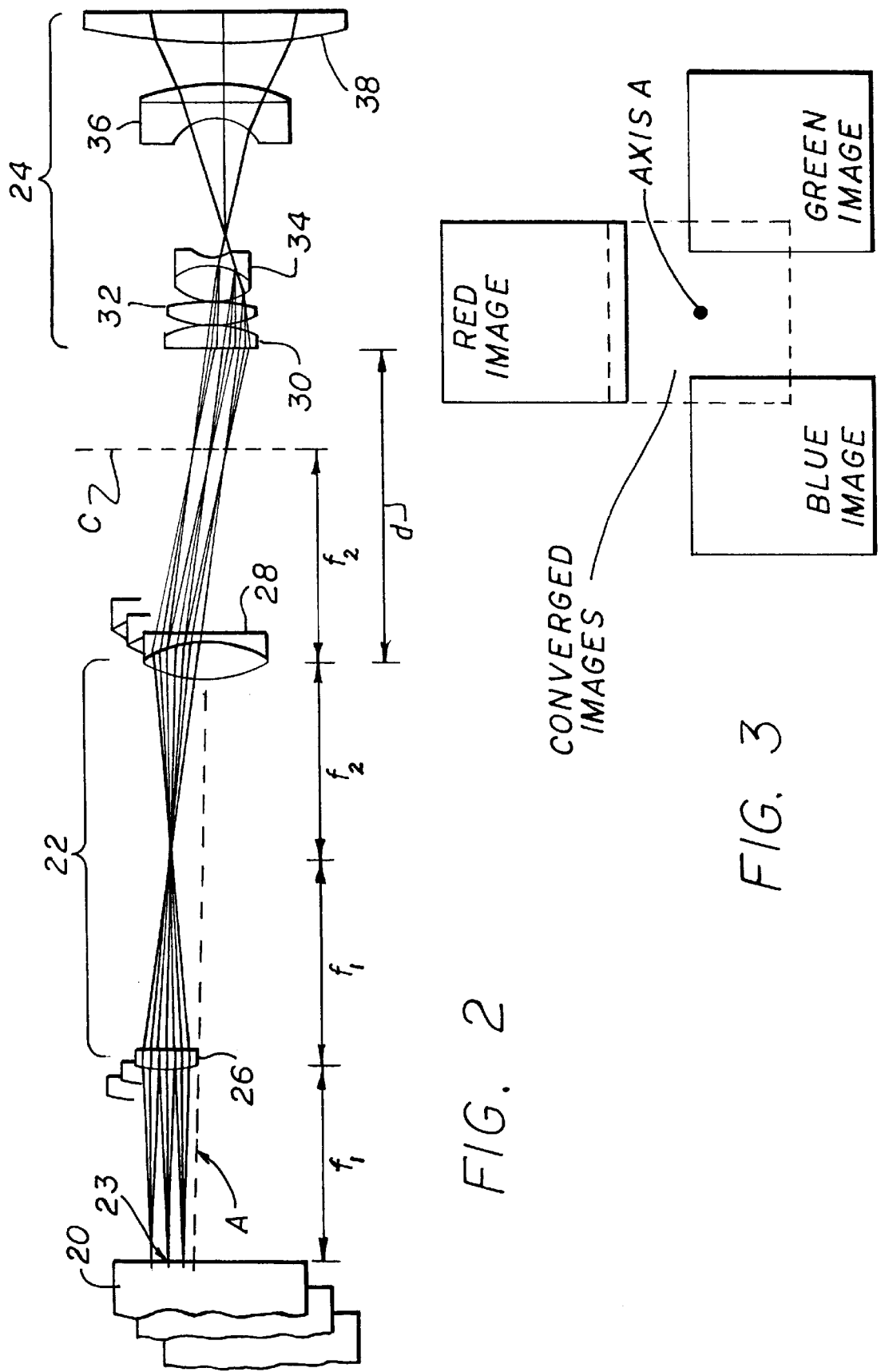
FIG. 2 is an enlarged side view of a projection lens, a light valve, and a converging optical system according to the present invention.
FIG. 3 is an end view illustrating the relative separation of the red, green and blue primary color images before convergence and the alignment after convergence.

FIG. 2 is a magnified side view of light valve 20, converging optical system 22 and projection lens 24. A first primary color image originates on a first light valve or a first of three surface portions 23 of a single light valve 20. The red, green and blue primary color images originate within the three separate surface portions 23 of the light valve 20 or on three separate light valves. The three image-generating surface portions 23 of the light valve 20 or the three separate light valves are symmetrically arranged about an optical axis "A". The end view of FIG. 3 illustrates the relative separation of the red, green and blue primary color images as created by the light valve 20 or three separate light valves. In addition, FIG. 3 shows the relative orientation of the primary color images to the optical axis "A" and to the converged image arising at the convergence plane "C".

Referring again to FIG. 2, converging optical system 22 includes first relay lenses 26 of a first focal length $f_1$. Each of the three first relay lenses 26 is preferably positioned a distance corresponding generally to $f_1$ from one of the three surface portions 23 of the light valve 20 (or from one of the three separate light valves). This arrangement results in optical alignment between the first relay lenses 26 and the red, green and blue primary color images. The first relay lenses 26 redirect the first, second and third primary color images to second relay lenses 28. For ease of illustration and understanding, only the ray trace of one primary color image is shown. However, it should be understood that the other two primary color images have similar associated ray traces.

Figure 2A:
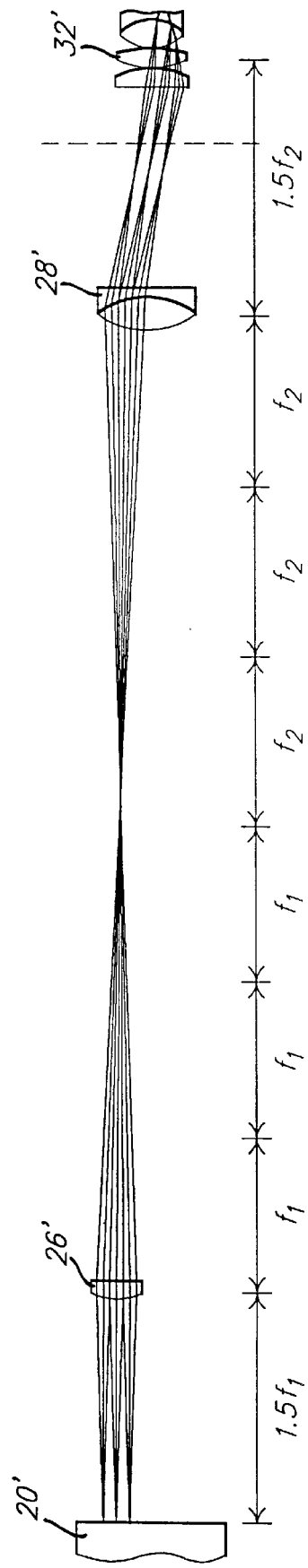
FIG. 2A illustrates an alternate arrangement of certain of the optical components shown in FIG. 2.

While in the preferred embodiment the first relay lenses 26 are positioned the first focal length $f_1$ from the light valve, skilled artisans can appreciated that first relay lenses 26 as well as the second lenses 28 can be located in other positions. For example, as shown in FIG. 2A, representative first relay lens 26' can be positioned at a distance corresponding generally to $1.5f_1$ from the light valve 20'. Second relay lens 28' can be positioned at a distance corresponding generally to $1.5f_2$ from the projection lens 32'. The first and second lenses 26', 28' can then be separated by a distance corresponding generally to $3f_1+3f_2$ from each other. Other relay lens configurations are also possible.

In a preferred embodiment of FIG. 2, second relay lenses 28 and first relay lenses 26 are horizontally separated by a distance corresponding generally to $f_1+f_2$ (the focal length $f_2$ of second relay lenses 28 plus the focal length $f_1$ of first relay lenses 26). In a highly preferred embodiment, the focal length $f_1$ of the first relay lenses 26 is equal to the focal length $f_2$ of the second relay lenses 28. As can be appreciated, the position of the double lens relays can be varied from this disclosed arrangement as desired. Using lenses having these characteristics, converging optical system 22 forms a 1:1 split lens relay system. Skilled artisans can appreciate that converging optical system 22 may also be adapted to realize converging optics of other magnifications by adjusting the relative focal lengths of the first and second relay lenses.

Second relay lenses 28 overlap the three primary color images to create a converged image at the focus of second relay lenses 28, which is located in the convergence plane "C". The convergence distance "c" (see FIG. 1) associated with the second relay lenses 28 is therefore equal to the focal length $f_2$ of second relay lenses 28.

The arrangement of the first and second lenses 26 and 28 within converging optical system 22 allows the primary color images to remain substantially converged subsequent to passing through the convergence plane "C". This characteristic of the inventive projection system 10 enables the distance "d" between projection lens 24 and second relay lenses 28 to be adjusted in order to achieve a desired image magnification without affecting convergence of the composite image projected on screen 14. Moreover, since the primary color images are converged prior to projection by lens 24 onto screen 14, the separation "S" between screen 14 and projection lens 24 may be varied without adjusting the relative positions of first relay lenses 26, second relay lenses 28 and projection lens 24.

As shown in FIG. 2, projection lens 24 includes first 30, second 32, third 34, fourth 36 and fifth 38 lens elements. Projection lens 24 may be realized by a number of commercially available projection lenses. It is noted that the requisite acceptance angle of projection lens 24 will vary as the distance "d" separating second relay lenses 28 and projection lens 24 is adjusted to effect a particular image magnification.

A feature of the inventive image projection system 10 is that only a single projection lens 24 is needed in order to display three primary color images on the screen 14. In contrast, conventional light valve image projectors generally utilize a separate projection lens for each primary color image. Since applications involving short projection throw distances typically require relatively large, wide-angle projection lens arrangements, the single-projection lens design of the present invention allows for economies of size and weight.

Referring again to FIG. 1, a set of at least three optical sensors 40 may be mounted on screen 14 to determine the position of each of the primary color images thereon. Each sensor is operative to detect the screen position of a particular primary color image. Information regarding the relative position on screen 14 of each primary color image is then electronically communicated to CRT 18 by way of a feedback line 44. The information on feedback line 44 is then used by the CRT 18 to make minor modifications in the location of the surface portions 23 of the light valve 20 at which the primary color images originate. In this manner, the relative positions of the primary color images on screen 14 are adjusted in accordance with the information provided by the screen sensors so as to effect final optical registration of the primary color images.

Thus the present invention has been described with reference to a particular embodiment in connection with a particular application. Those having ordinary skill in the art and access to the teachings of the present invention will recognize additional modifications and applications within the scope thereof. For example, converging optical system 22 is not limited to the particular 1:1 split lens relay arrangement described above. In alternative embodiments of the present invention it may be desired to effect other image magnifications by adjusting the split lens ratio. Moreover, the present invention is not confined to projection systems utilizing a single, tricolor light valve. The teachings of the present invention may be incorporated into projection systems which include any number of individual, single-color light valves.

It is therefore contemplated by the appended claims to cover any and all such modifications.

What is claimed is:

1. An image projection system, comprising:

an image generator for generating a plurality of color images;

optics in optical alignment with said image generator for overlapping said plurality of color images and forming a converged image; and a projection lens in optical alignment with said optics for projecting the converged image onto a projection screen and forming a composite image independent of a distance between said projection lens and the screen, and wherein a distance between said projection lens and said optics may be adjusted for achieving a desired image magnification without affecting convergence of the composite image.

2. The image projection system of claim 1, wherein said image generator comprises a light valve system.

3. The image projection system of claim 2, wherein said light valve system comprises a single light valve that generates first, second and third primary color images.

4. The image projection system of claim 2, wherein said light valve system comprises a first light valve that generates a first primary color image, a second light valve that generates a second primary color image, and a third light valve that generates a third primary color image.

5. The image projection system of claim 2, wherein said optics comprise a first relay lens having a focal length $f_1$ and positioned a first predetermined distance from said image generator, and a second relay lens having a focal length $f_2$ and positioned a second predetermined distance from said projection lens.

6. The image projection system of claim 5, wherein said first relay lens is positioned a distance corresponding generally to $1.5f_1$ from said image generator, and said second relay lens is positioned a distance corresponding generally to $1.5f_2$ from said projection lens.

7. The image projection system of claim 6, wherein said first and second relay lenses are spaced apart from each other by a distance corresponding generally to $3f_1+3f_2$.

8. The image projection system of claim 5, wherein said first and second relay lenses are spaced apart from each other by a distance corresponding generally to $f_1+f_2$.

9. The image projection system of claim 8, wherein $f_1=f_2$.

10. The image projection system of claim 5, wherein said converged image formed by said optics is formed at a convergence plane, said first and second relay lenses being arranged to allow the converged image to remain substantially converged through the convergence plane independently of the distance between said second relay lens and said projection lens.

11. The image projection system of claim 10, wherein said convergence plane is located at a distance from said second relay lens corresponding generally to the focal length of said second relay lens.

12. The image projection system of claim 1, wherein said optics comprise a split lens relay system having a first relay lens and a second relay lens, and wherein the ratio between a focal length of the first relay lens and a focal length of the second relay lens is 1:1.

13. The image projection system of claim 1, wherein the optics include a first relay lens and a second relay lens.

14. The image projection system of claim 1, wherein said projection lens includes multiple lens elements contained within a housing.

15. The image projection system of claim 14, wherein said projection lens is operative to project three primary color images on the screen to form the composite image.

16. The image projection system of claim 1, further comprising a feedback circuit in communication with said image generator that optically senses screen location data of projected primary color images and feeds the sensed data to the image generator for image projection adjustment purposes.

17. An image projection system, comprising:

an image generator, including at least one light valve, for generating red, green and blue optical images;

converging optics in optical alignment with said image generator for overlapping the red, green and blue images to form a converged image along an optical axis; and a projection lens configuration in optical alignment with said converging optics, and located on the optical axis, for illuminating an image screen with the converged image to form a composite image thereon;

wherein convergence of the converged image is independent of the distance between said converging optics and said projection lens configuration.

18. The image projection system of claim 17, wherein said projection lens configuration is a single lens configuration for displaying said converged image on the image screen.

19. An image projection system, comprising:

an image generator for generating a plurality of color images;

optics in optical alignment with said image generator for overlapping said plurality of color images to form a converged image;

a projection lens in optical alignment with said optics for projecting the converged image onto a projection screen and forming a composite image independent of the distance between said projection lens and said projection screen; and a feedback circuit in communication with said image generator for optically sensing screen location data of the projected color images, and feeding the sensed data to the image generator for image projection adjustment purposes.

20. The image projection system of claim 19 wherein the optics include a first relay lens and a second relay lens, the first and second relay lenses having the same focal length, and wherein the optics converge the image at a convergence plane positioned a distance c from the second relay lens.

21. The image projection system of claim 20 wherein c is less than the distance between the optics and the projection lens.

22. The image projection system of claim 19 wherein the convergence of the converged image is independent of the distance between said optics and said projection lens.

23. An image projection system, comprising:

an image generator for generating a plurality of color images;

optics in optical alignment with said image generator for overlapping said plurality of color images and forming a converged image, said optics including a first relay lens and a second relay lens; and a projection lens in optical alignment with said optics for projecting the converged image onto a projection screen and forming a composite image independent of a distance between said optics and said projection lens.

24. The image projection system of claim 23 wherein the convergence of the converged image is independent of a distance between said projection lens and said projection screen.

* * * * *